United States Patent
Umeda et al.

[11] Patent Number: 5,965,965
[45] Date of Patent: Oct. 12, 1999

[54] STATOR WINDING ARRANGEMENT OF ALTERNATOR FOR VEHICLE

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/084,245

[22] Filed: May 26, 1998

[30] Foreign Application Priority Data

Feb. 13, 1998 [JP] Japan .................................. 10-049040

[51] Int. Cl.⁶ .............................. H02K 9/04; H02K 3/24
[52] U.S. Cl. .......................... 310/52; 310/59; 310/60 R; 310/201; 310/179
[58] Field of Search .................... 310/179, 180, 310/201, 52, 58, 59, 60 R, 208, 195, 184, 189, 263

[56] References Cited

U.S. PATENT DOCUMENTS

| | | | |
|---|---|---|---|
| 1,822,261 | 9/1931 | Apple | 310/201 |
| 1,826,295 | 10/1931 | Apple | 310/179 |
| 2,407,935 | 9/1946 | Perfetti et al. | 310/201 |
| 3,453,468 | 7/1969 | Lund | 310/201 |
| 4,238,702 | 12/1980 | Belova et al. | 310/179 |
| 5,778,512 | 7/1998 | Ichikawa et al. | 310/201 |

FOREIGN PATENT DOCUMENTS

| | | |
|---|---|---|
| 56-98358 | 8/1981 | Japan . |
| 60-237831 | 11/1985 | Japan . |
| A-7-303351 | 11/1995 | Japan . |
| A-8-205441 | 8/1996 | Japan . |
| A-8-298756 | 11/1996 | Japan . |
| 1 388 512 | 3/1975 | United Kingdom . |
| 92/06527 | 4/1992 | WIPO . |

*Primary Examiner*—Nestor Ramirez
*Assistant Examiner*—Burton S. Mullins
*Attorney, Agent, or Firm*—Pillsbury Madison & Sutro LLP

[57] ABSTRACT

An alternator for a vehicle includes a fan for supplying cooling air along an inner circumference of coil-end groups disposed opposite ends of a stator in an axial direction. Each of the coil-end groups is composed of a plurality inner coil-end portions disposed at an inner circumference of the coil-end groups to extend from an end of the stator core and outer coil-end portions disposed at an outer circumference of the coil-end groups to extend from an end of the stator core. The inner coil-end portion extends in a direction between the axial direction and rotating direction of the rotor.

16 Claims, 8 Drawing Sheets

5,965,965

STATOR WINDING ARRANGEMENT OF ALTERNATOR FOR VEHICLE

BACKGROUND OF THE INVENTION

1. Field of the Invention

The present invention relates to an alternator driven by an engine which is mounted in a vehicle, a truck or a boat.

2. Description of the Related Art

As disclosed in JP-A-56-98358, a rotor having a mixed flow fan on one end thereof for sending cooling air in the axial direction to cool the inner periphery of a stator and the rotor.

WO92/06527 discloses a stator winding of an alternator for a vehicle. The stator winding is composed of a plurality of conductor segments, each of which can be disposed more regular than a stator winding composed of a continuously wound wire.

Although the mixed flow fan of the structure disclosed in JP-A-56-98358 provides axially flowing air, the stator winding composed of the continuously wound wire has irregularly wavy surfaces which obstructs the air flow. Therefore, effective cooling can not be attained.

According to WO92/06527, although coil ends are arranged to be regular, the coil ends are not arranged to be suitable for axial flow of the cooling air. Therefore, the air flow along surfaces thereof is obstructed.

SUMMARY OF THE INVENTION

An object of the present invention is to provide effective axial cooling air flow.

Another object of the present invention is to provide an improved structure of coil ends of the stator and rotor which provides high cooling performance with low noise, and does not require without addition of any parts.

According to a main feature of the present invention, an alternator for a vehicle includes means for supplying cooling air along an inner circumference of coil-end groups in an axial direction. The coil-end groups includes a plurality of conductor segments each having an inner coil-end portion disposed at the inner circumference of the coil-end groups to extend from an end of the stator core and an outer coil-end portion disposed at an outer circumference of the coil-end groups to extend from an end of the stator core. The inner coil-end portion extends in a direction between the axial direction and rotating direction of the rotor. For example, the inclined conductor segments extend at an angle of 60° from the axial direction of the cooling air and at an angle of 30° from the rotating direction. Both inclination angles allow an effective supply of the cooling medium to be provided to the coil. The angles are determined according to the ratio between the axial direction of the cooling medium and the rotating direction.

The cooling medium supplied by means for supplying cooling air and flowing one way in an axial direction inside the coil ends is affected by the rotation of the rotor to contain the component of the rotating direction. Therefore, the cooling air is apt to flow in a spiral path.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
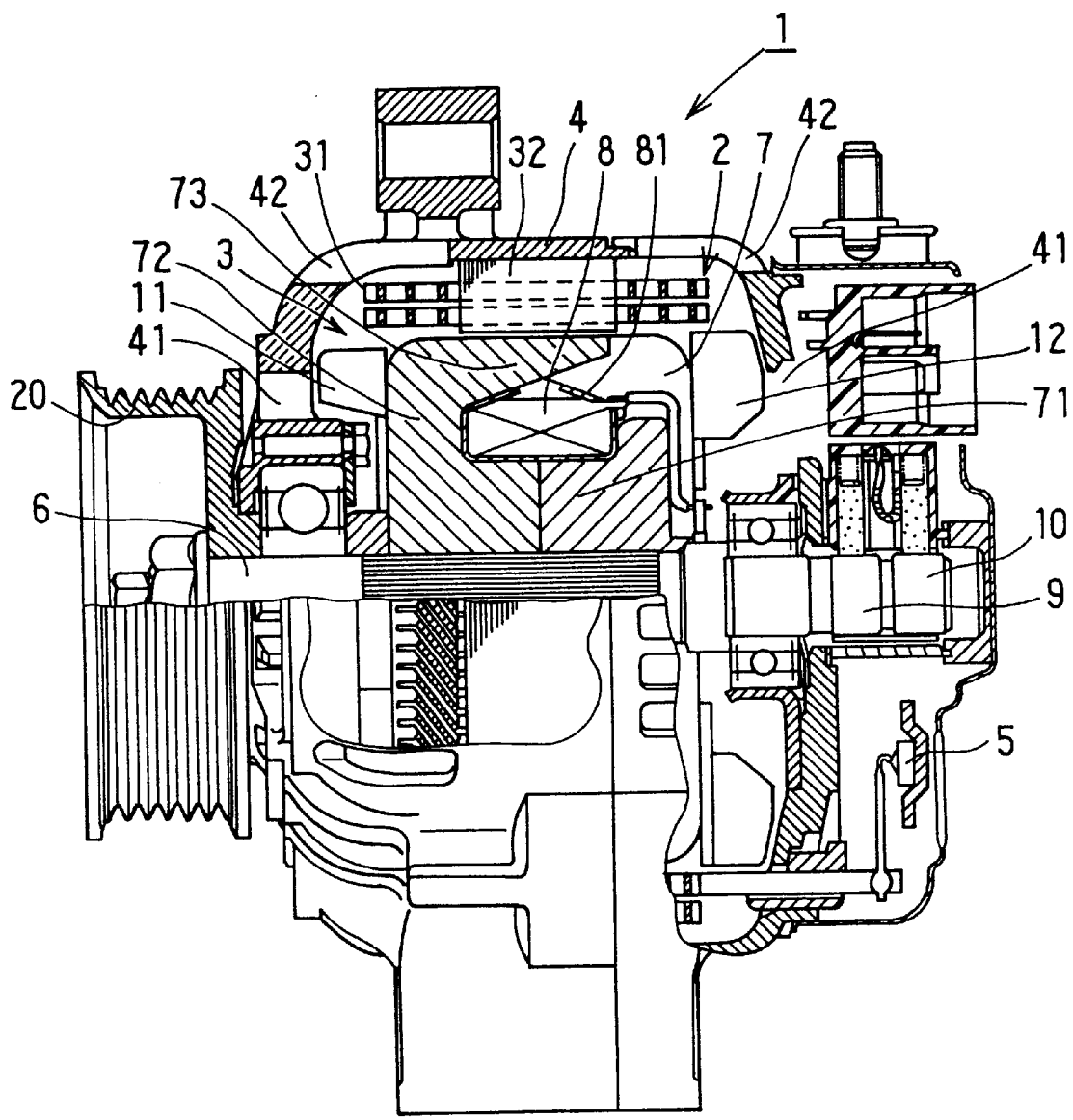
FIG. 1 is a cross-sectional view of a main portion of an alternator for a vehicle according to a first embodiment of the present invention.

An alternator for a vehicle according to a first embodiment of the present invention is described with reference to FIGS. 1–10.

Alternator 1 is composed of stator 2, rotor 3, frame 4 for supporting stator 2 and rotor 3 and rectifier 5 for converting as power to dc power. Rotor 3 rotates with shaft 6 and has Lundell type pole cores 7, field coil 8, slip rings 9, 10, mixed flow fan 11 and centrifugal fan 12. Shaft 6 is connected to pulley 20 which is driven by an engine (not shown) mounted on a vehicle.

Pole core 7 is composed of a pair of pole core members. Each of the pole core members is composed of boss portion 71 fitted to shaft 6, disk portion 72 extending radially from boss portion 71 and a plurality of claw poles 73. Field coil 8 is fitted to the inner periphery of claw poles 73 via insulation sheet 81. Insulation sheet 81 is composed of a sheet impregnated with insulation resin, which is heated and bonded to field coil 8 to insulate field coil 8 from pole core 7.

Frame 4 has air discharge windows 42 at portions opposite coil ends 31 of stator 2 and air intake windows 41 at the ends thereof. Stator 2 is composed of stator core 32, conductor segments 33 forming the stator winding and insulator 34 for insulating conductor segments 33 from stator core 32, and is supported by frame 4. Stator core 32 is composed of laminated steel sheets and has a plurality of slots 35 at the inner periphery thereof.

Figure 3:
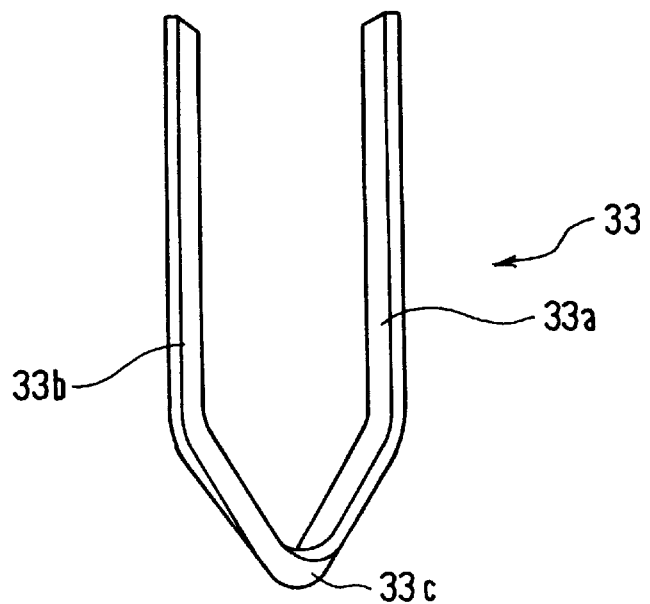
FIG. 3 is a perspective view of a conductor segment according to the first embodiment.

Two conductor segments 33 having rectangular cross-section are inserted into each of slots 35, and the stator winding is composed of a plurality of conductor segments 33, one of which is illustrated in FIG. 3, connected to one another. The shape of the cross-section of the conductor is a rectangle having the longer sides in the radial direction than the sides in the circumferential direction.

Figure 2:
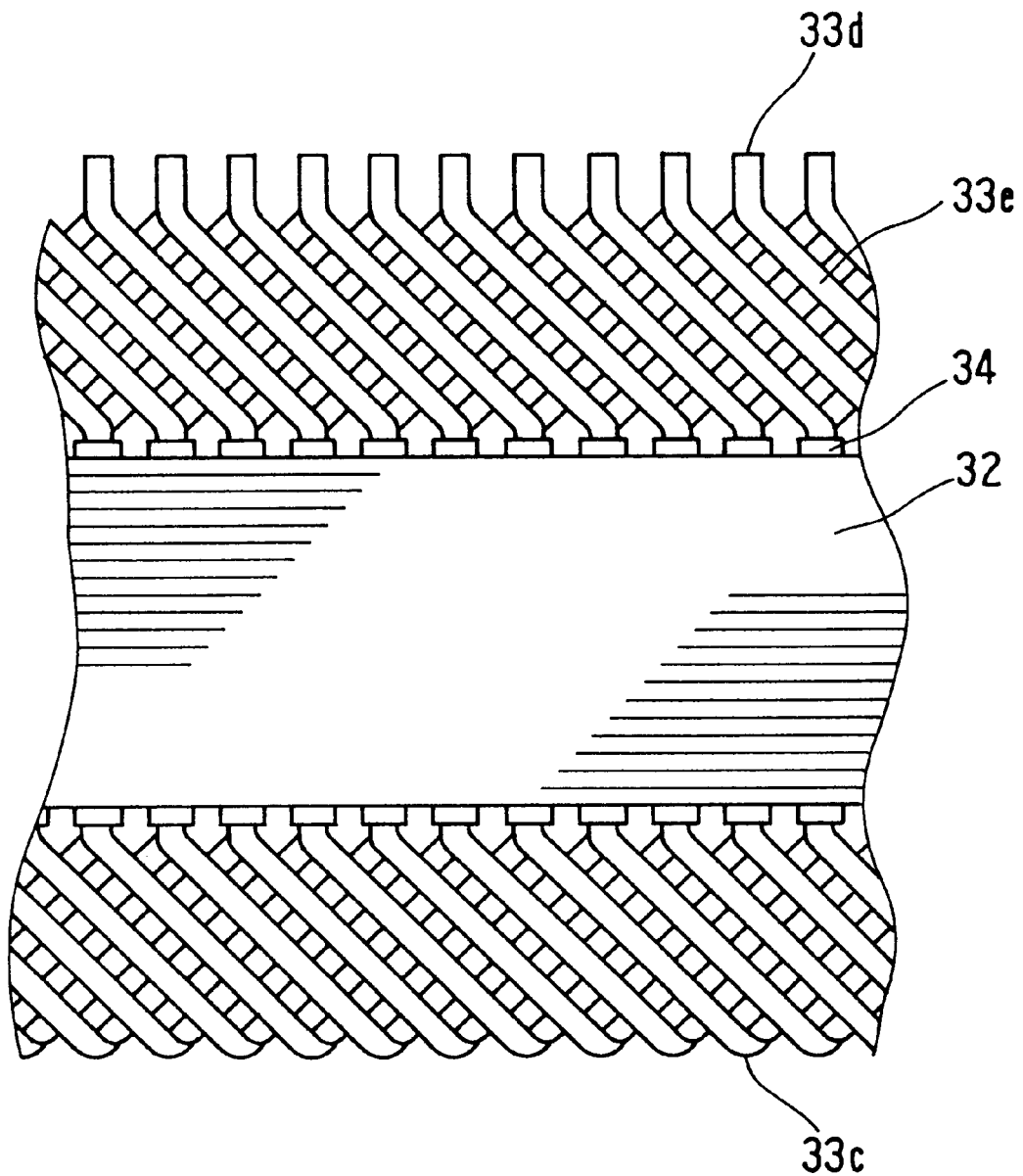
FIG. 2 is a outside view of a stator according to the first embodiment.

As shown in FIG. 2, U-turn portions 33c are disposed on one axial end of stator core 32, and joint portions 33d are disposed on the other end thereof. Inclined portions of the coil ends of conductor segments 33 in the outer layer are inclined oppositely to those in the inner layer. The inclination angle is the same in the same layer. Insulation coating is not always necessary for conductor segments 33.

Figure 4:
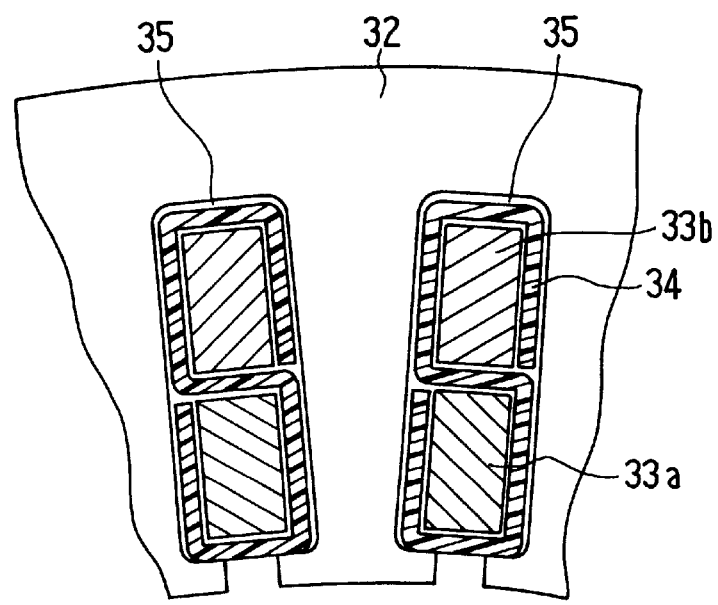
FIG. 4 is a fragmentary sectional view of the stator according to the first embodiment.
Figure 5:
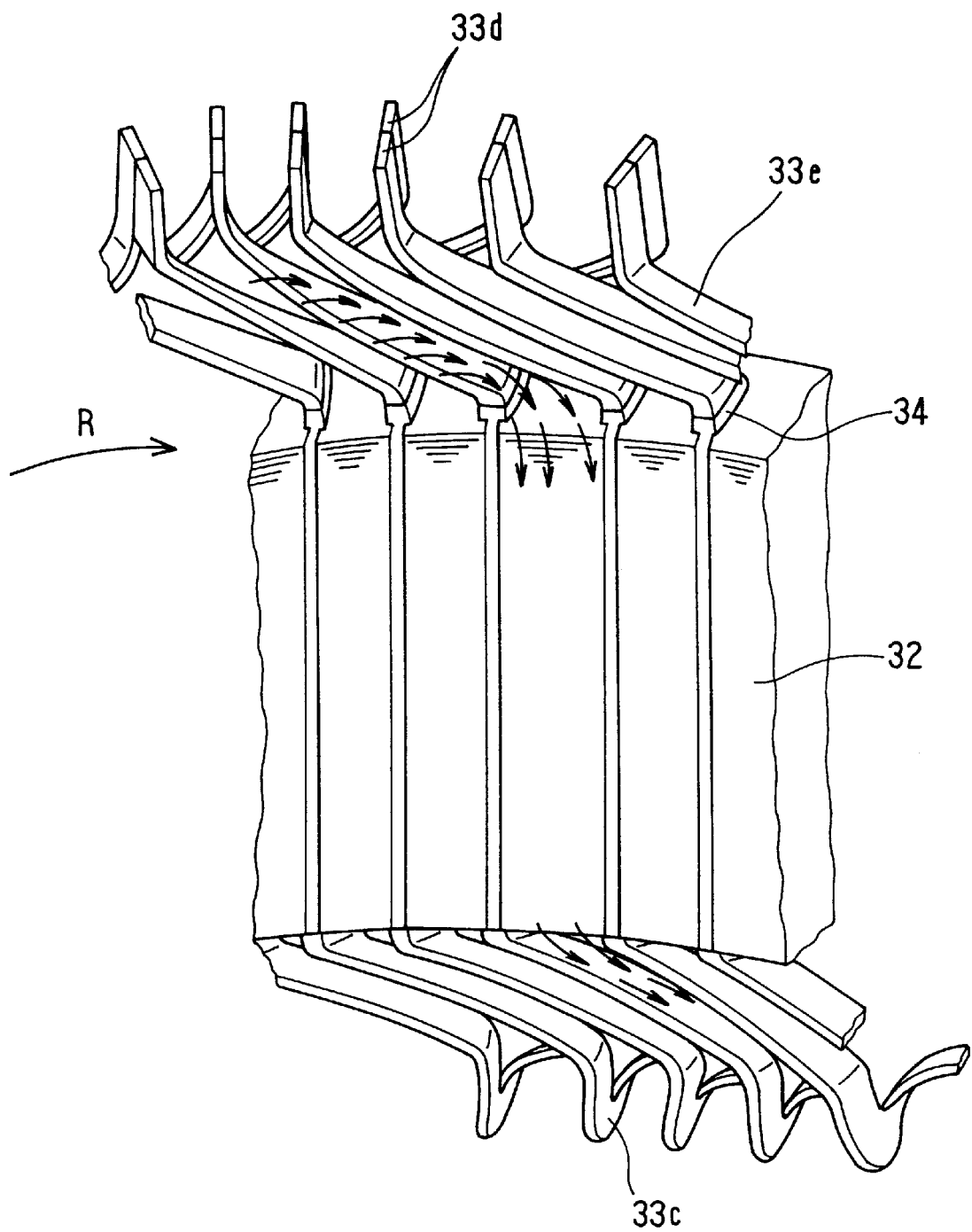
FIG. 5 is a perspective view of coil ends at opposite ends of the stator according to the first embodiment.

Manufacturing of the stator winding is as follows. Each of U-shaped conductor segments 33 is composed of conductor portion 33b to be disposed in the outer layer, conductor portion 33a to be disposed in the inner layer and U-turn portion 33c. U-shaped conductor segments 33 are placed so that U-turn portions 33c are disposed on the same axial end of stator core 32. As shown in FIG. 4, conductor portions 33b in the outer layer are inserted into the rear side of the slots, and conductor portions 33a in the inner layer are inserted into the front side of the slot. Each of conductor segment 33 is formed from a copper plate, which is bent and shaped into a U-shape by a press machine or the like. Each of the conductor portions is press-fitted between parallel side walls of the outer layer or inner layer of corresponding slots via insulator 34. As shown in FIG. 5, end portions 33d formed opposite coil end 31 formed by U-turn portion 33c are bent outward in the circumference from each other.

In this embodiment, the rotor has 16 poles, and stator core 32 has 96 slots. Conductor segments 33 are connected to form a three-phase winding.

Figure 6:
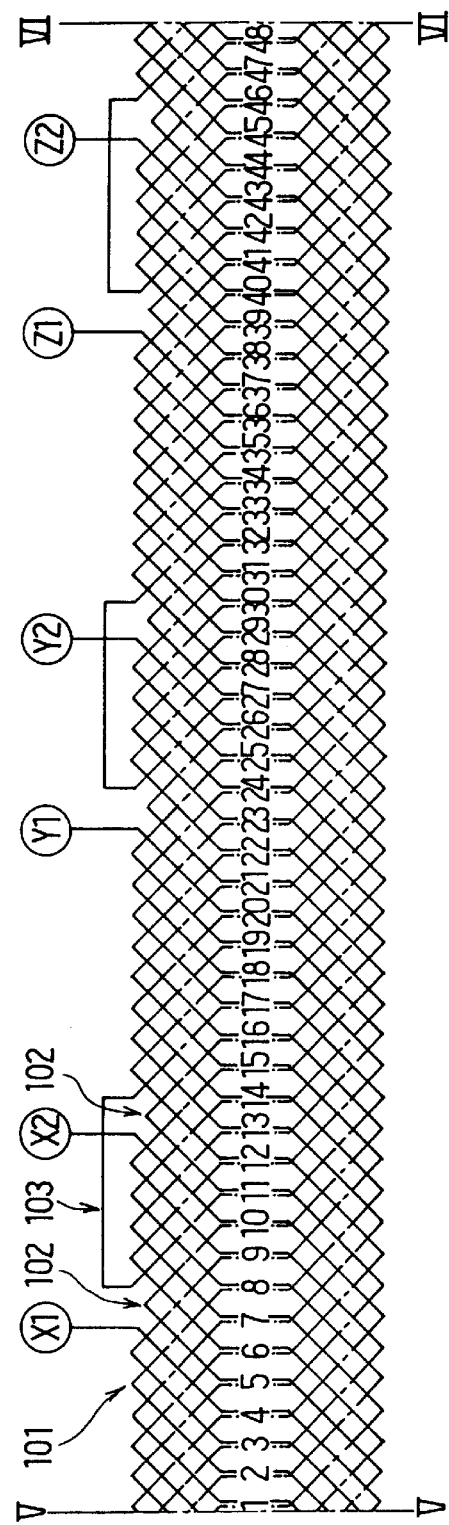
FIG. 6 is a winding diagram of a stator winding according to the first embodiment from first to 48th slots.
Figure 7:
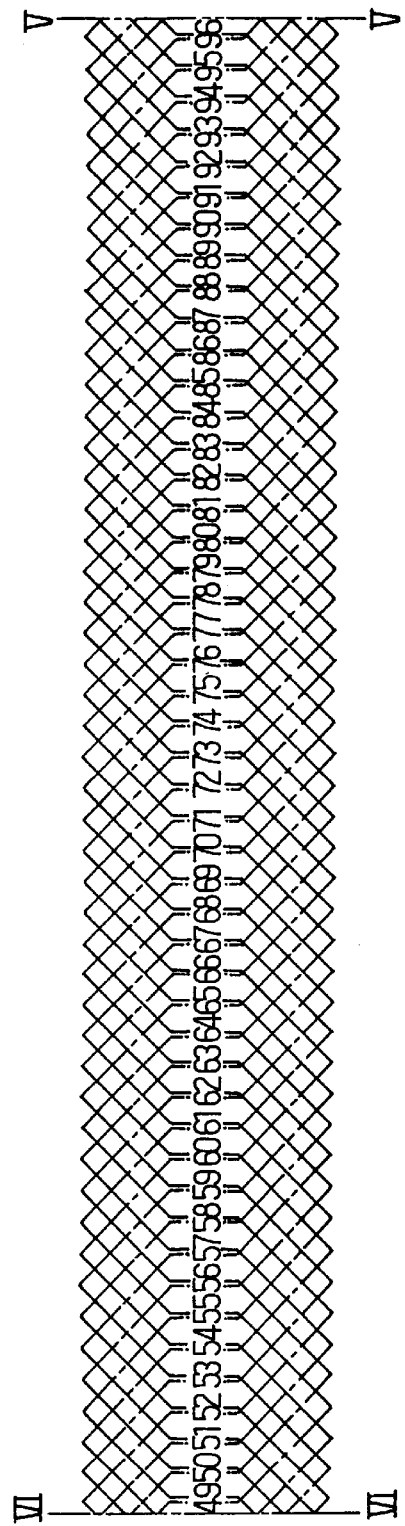
FIG. 7 is a winding diagram of the stator according to the first embodiment from 49th to 96th slots.
Figure 8:
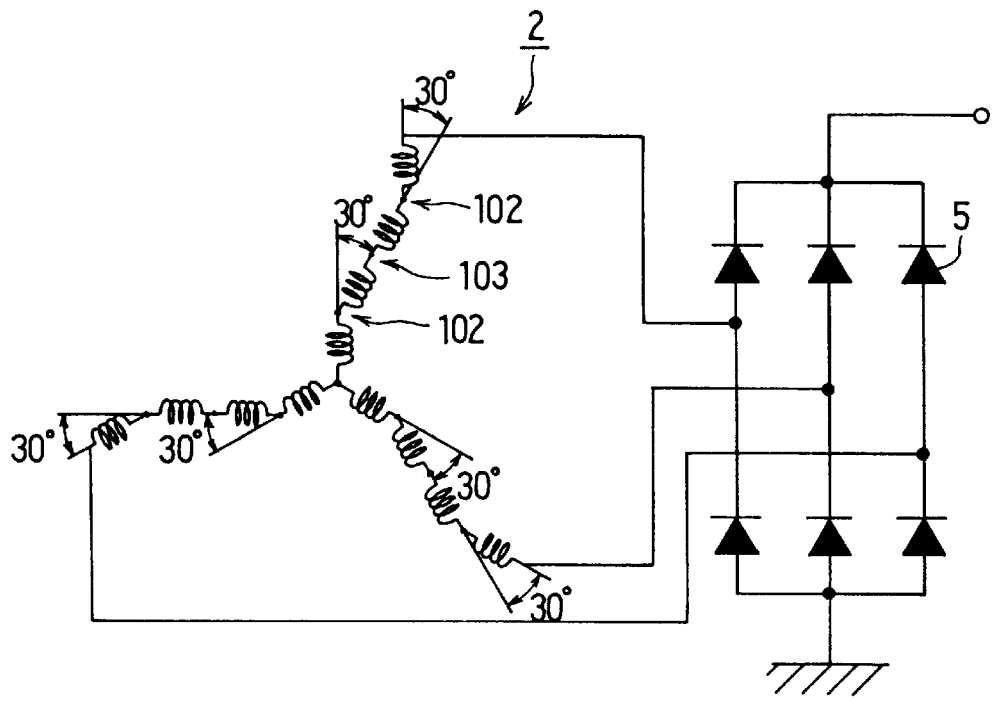
FIG. 8 is a circuit diagram of the alternator according to the first embodiment.

FIGS. 6, 7 and 8 illustrate an example of the winding. Solid lines represent conductor segments 33 disposed in the outer layer, and one-dot chain lines represent conductor segments 33 disposed in the inner layer.

Firstly, an X-phase winding is described hereafter. The slots numbered with 4, 10, 16 and the every successive sixth slot to the slot numbered with 94 form a first slot group. The slots numbered with 5, 11, and 17 and the every successive sixth slot to the slot numbered with 95 form a second slot group. A first winding starting from terminal X1 is formed in the first slot group and connected in series to a second winding by one of joint portions 102 as shown in FIG. 6. The second winding is turned over by conductor portion 103 disposed in the same layer so that the conductor segments 33 of the same phase winding disposed in the same slot can be connected in series. The second winding is also connected in series with the first winding ending at terminal X2 by the other of joint portions 102.

Thus, the X-phase winding is composed of a pair of series-connected stator windings whose phase angle are 30° in electric-angle different from each other. Y-phase and Z-phase windings are also composed of stator windings in the same manner and disposed, respectively, in the stator core at 120° pitch in electric angle, thereby forming a three-phase star winding shown in FIG. 8.

Figure 9:
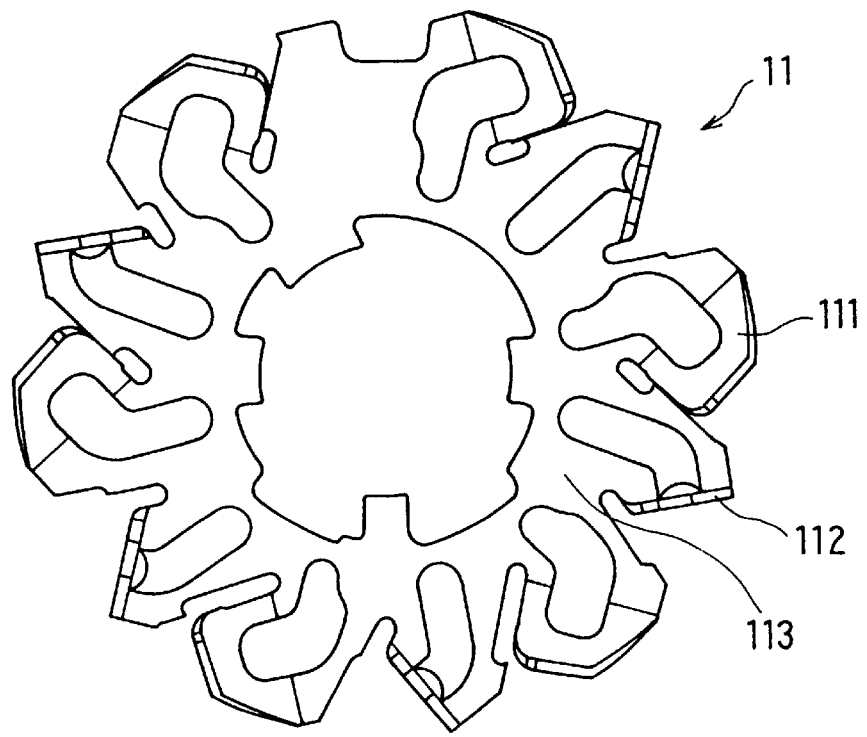
FIG. 9 is a front view of a fan of a rotor according to the first embodiment.
Figure 10:
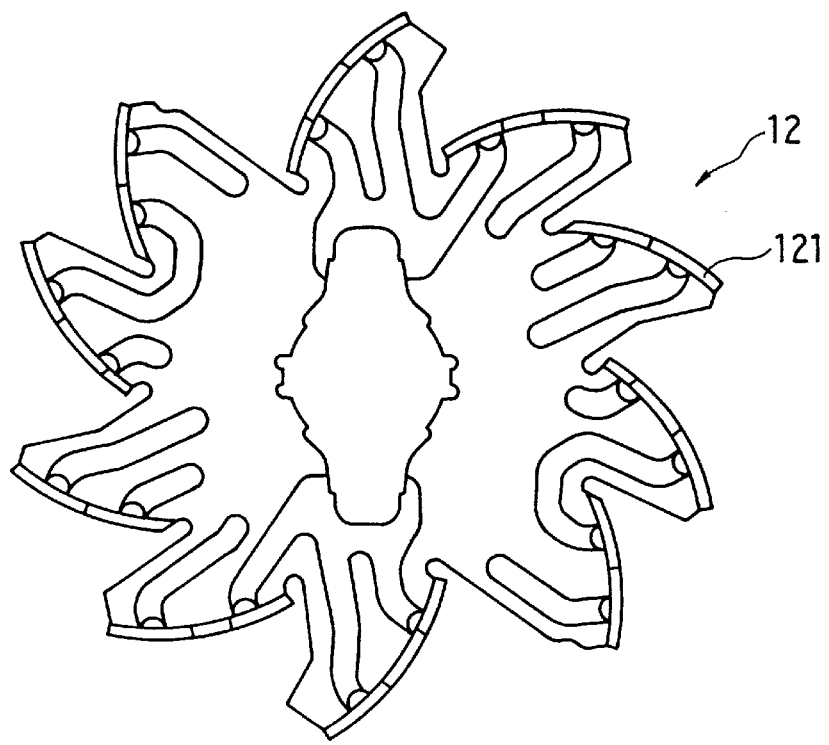
FIG. 10 is a front view of the other fan of the rotor according to the first embodiment.

Pulley-side cooling fan 11 has a plurality of blades 111 slanting to base plate 113 and a plurality of blades 112 perpendicular to base plate 113 as shown in FIG. 9. A plurality of blades 111 are slanted at an acute angle to base plate 112 against the rotating direction R. Base plate 113 is welded to the end surface of pole core 7 to be rotatable with rotor 3. Counter-pulley-side cooling fan 12 has a plurality of perpendicular blades 121 and no other blades.

FIG. 5 is a perspective view illustrating inclined conductor segments 33 of coil ends 31 disposed on the inner circumference and the rotating direction R of rotor 3. Viewing from the side of pulley 20, rotor 3 rotates clockwise.

With the above-described structure, inclined portions 33e of coil ends 31 incline in the same direction in the same layer, so that a plurality of the stator windings can be disposed without interference with one another. Accordingly, regular continuous patterns are formed in inner circumference of the coil ends 31 instead of substantially uneven portions. Because the conductor segments 33 on the inner circumference of coil ends 31 incline in the same direction at opposite ends of stator core 32, cooling air flows along the same direction. Therefore, it is possible to reduce noise generated when the cooling air sent from cooling fans 11, 12 blows on the inner circumference of the coil-ends.

As shown in FIG. 5, an annularly-disposed conductor segments 33 of the inner circumference of coil ends 31 incline along the cooling air flow in the forward rotating direction R of rotor 3. The cooling air, which is driven by fan 11 to flow along the inner circumference of coil ends 31 in one-way axial direction, is drawn by the rotation of rotor 3 to include a component of the rotating direction R. Thus, the cooling air flows in a spiral or whirl.

In other words, the inclined portions of coil ends 31 guide the cooling air to flow in the axial direction more effectively as indicated by arrows in FIG. 5.

Because rotor 3 is provided with spaces between contiguous adjacent two of the pole cores, field coil 8 can be cooled by the axially flowing cooling air. Forward direction defined here is a direction between the direction of the cooling air flowing in the axial direction and rotating direction R of rotor 3.

Cooling fan 11 on the side of pulley 20 has a plurality of slanted blades 111. When rotor 3 rotates in direction R in FIG. 9, blades 111 drive the cooling air in the axial direction. Thus, the strong cooling air in the rotating direction can be supplied along the inner circumference of coil ends 31 without obstructing the air flow in the axial direction. As a result, the cooling air in the axial direction is increased to raise the cooling effect and the output power.

The cooling air is taken in from the side of the pulley 20 where ambient temperature is lower, and the temperature of the axial flow can be lowered so that field coil 8 can be cooled effectively.

The number of slots is six times as many as the number of the poles of rotor 3, and the conductor segments 33 in the adjacent slots 35 are connected in series.

The following structure is available instead of the above-described structure. It is preferable that each coil end is spaced apart from each other, and that the cooling-air passages are formed in the radial direction to be transverse to the coil-end groups. However, the coil ends can be coated with resin to close gaps between the coil ends as far as there are convex-concave patterns due to the inclined portions of the conductor segments 33 inside the coil ends.

Two coil ends 31 are formed from joint portions 33d if S-shaped segments 33, each of which corresponds to a half portion of the U-shaped segment shown in FIG. 3, are used instead of U-shaped segment. The joint portions of the two segments 33 are substituted for U-turn portion 33c.

It is possible to insert two or more conductor segments 33 in each of slots 35. In other words, four or more conductor segments 33 can be inserted into each of slots 35 to increase the number of turns of the stator winding.

Second Embodiment

An alternator according to a second embodiment is described with reference to FIGS. 11–13.

Figure 11:
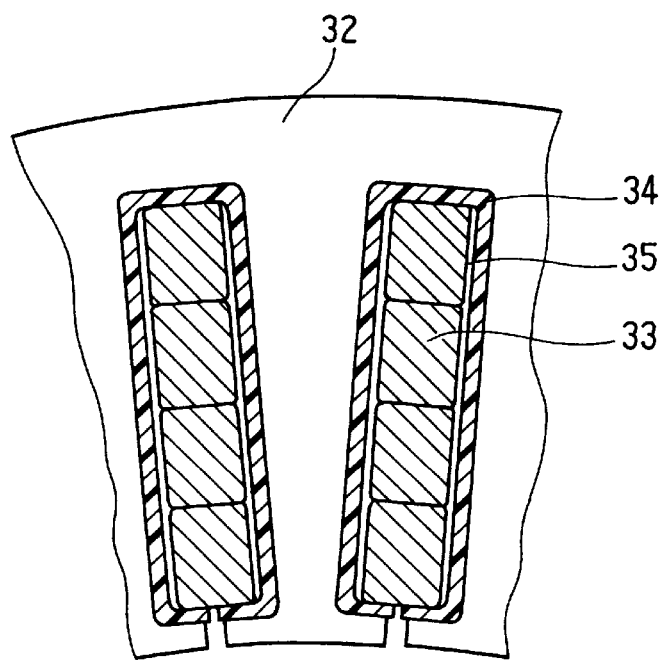
FIG. 11 is a fragmentary cross-sectional view of a stator according to another embodiment.
Figure 12:
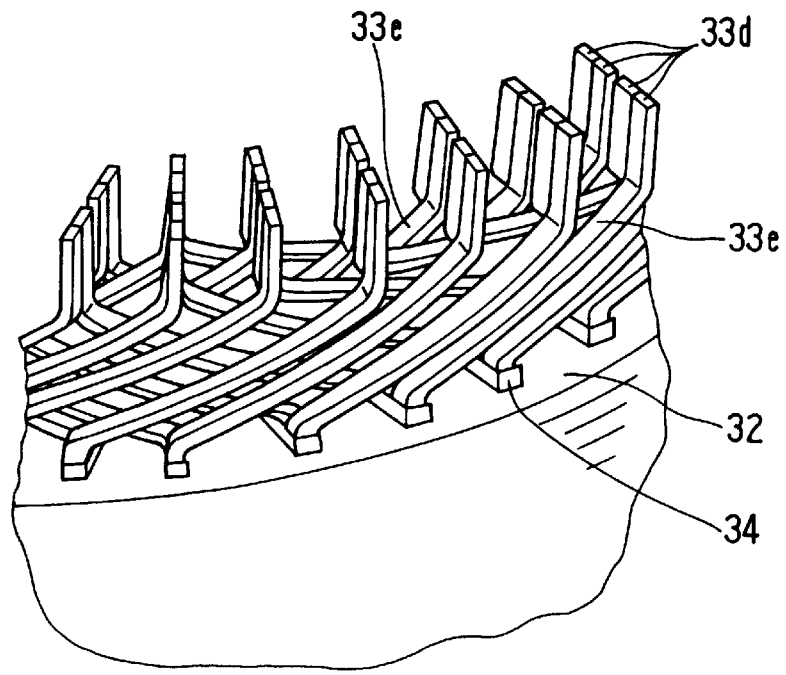
FIG. 12 is a fragmentary perspective view of the stator of another embodiment.

As shown in FIG. 11, four conductor segments 33 are inserted into each of slots 35 to align in the radial direction. Conductor segments 33 covered with insulation coating are inserted, and an insulation sheet is disposed between a bundle of conductor segments 33 and the wall of slot 35. Joint portions of this structure are shown in FIG. 12. Each of four conductor segments 33 in each slot 35 extends oppositely from each other in the circumferential direction. The end portions 33d of conductor segments 33 in one slot are connected to the end portions 33d of connectors in other slots. As shown in FIG. 12, the innermost conductor segments 33 are connected to the conductor segments 33 in the second layer, and the conductor segments 33 in the third layer are connected to the conductor segments 33 in the outermost circumference of the coil-end groups. Accordingly, a plurality of joint portions 33d are disposed annularly in two layers, inner layer and outer layer. In other words, a plurality of joint portions 33d are spaced apart from one another in both circumferential direction and radial direction. In this structure, the incline direction of the conductor segments 33, rotating direction R of rotor 3 and axial component of the cooling air flow in the coil-end groups are arranged so that the conductor segments 33 in the innermost circumference of the coil-end groups can be inclined in the forward direction with respect to the axial direction and the rotating direction R.

In addition to the conductor segments 33 of the innermost circumference, the conductor segments 33 of the circumference second therefrom can be inclined in the forward direction with respect to the axial direction and the rotating direction R.

The conductor segments 33 can also be disposed in the circumference direction. For example, four conductor segments 33 can be disposed squarely, and bare conductor segments 33, conductor segments 33 having square or elliptic cross-section can also be used. In order to let the cooling air to flow easily, it is preferable to select the shape of the cross-section of the conductor segments 33 and disposition thereof in the inner circumference of the coil-end groups. For example, the conductor segments 33 are selected to have grooves having sufficient depth and width on the inner circumference of the coil-end groups.

In this embodiment, cooling fans 11, 12 are disposed on the opposite sides of rotor 3. However, such fans can be omitted if temperature rise is not so high. In this case, the side walls of the disk portions 72 of pole core 7 function as centrifugal fan blades so that the centrifugal cooling air can be modified to axial cooling air by the inclined portions of the conductor segments 33 of the inner circumference of the coil ends.

Figure 13:
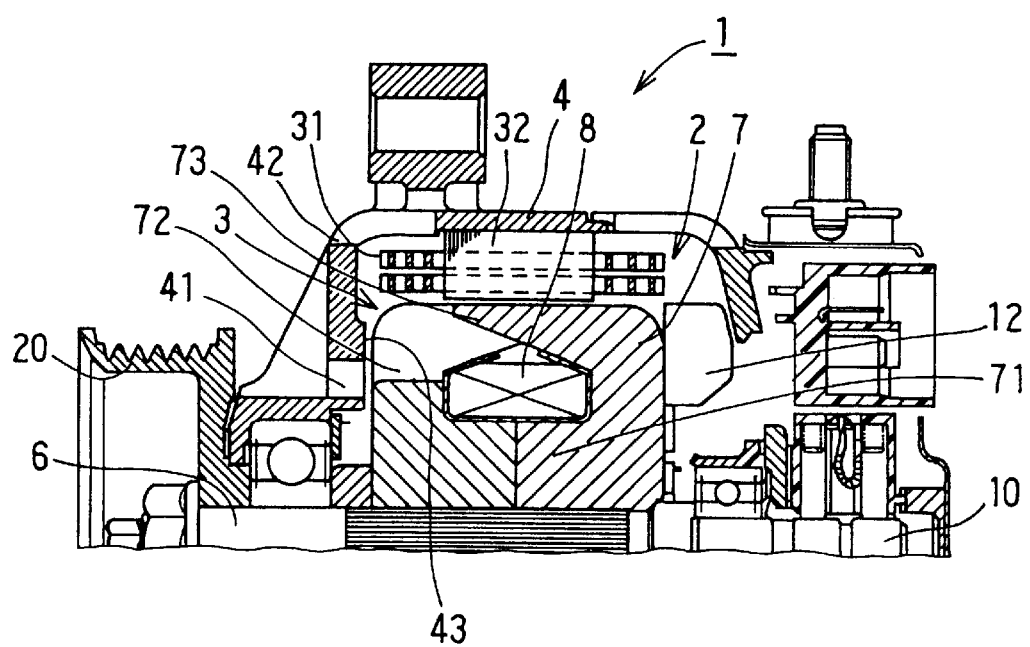
FIG. 13 is a cross-sectional view of a main portion of an alternator for a vehicle according to another embodiment.

As shown in FIG. 13, the pulley-side end of rotor without fan 11 can be disposed close to the pulley-side inner wall 43 of frame 4 around intake windows 41. Thus, inner wall 43 functions as a fan shroud to increase the fan effect of the disk portions 72 of the pole core, thereby increasing the axial air flow. Thus, the cooling effect of the field coil can be increased without increasing the number of parts and work time.

If the ambient temperature around the pulley 20 is comparatively high, cooling fan 12 disposed at the side opposite pulley 20 can be provided with fan blades for driving cooling air axially inside and also inclined portions of the conductor segments 33 of the inner circumference of coil ends 31 can be extended in the opposite direction. Thus, the structure can be applied so that the cooling air is taken from the side where the ambient temperature is comparatively low according to the circumstances. That is, the rotating direction R of rotor 3 and incline direction of the coil ends are selected to supply the cooling air from the side where the ambient temperature is comparatively low. Thus, temperature of the axial cooling air flow can be lowered to cool magnetic field coil 8 effectively.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle, comprising:
    a stator having a stator core with a plurality of slots and a stator winding,
    a rotor disposed opposite said stator, and
    means for supplying cooling substance along an inner circumference of said coil-end groups in an axial direction, wherein
        said stator winding comprises conductor portions disposed in said stator core and a pair of annular coil-end groups disposed on opposite ends of said stator core,
        one of said coil-end groups comprises a plurality of inner coil-end portions disposed at an inner circumference of said coil-end groups to extend from an end of said stator core and outer coil-end portions disposed at an outer circumference of said coil-end groups to extend from the same end of said stator core,
        said inner coil-end portions extend in a direction between the axial direction and rotating direction of said rotor thereby forming cooling passages alone said inner coil-end portions, and
        said rotor is disposed such that said cooling substance supplied from said means for supplying cooling substance in said axial direction is directed into said cooling passages.

2. The alternator for a vehicle as claimed in claim 1, wherein
    said means for supplying cooling substance supplies said cooling substance to both said pair of coil-end groups and the inner periphery of said stator core.

3. The alternator for a vehicle as claimed in claim 1, wherein
    said means for supplying cooling substance has a plurality of blades disposed on an end of said rotor radially inside of one of said coil-end groups.

4. The alternator for a vehicle as claimed in claim 1, wherein
    the other of said coil-end groups has opposite inner coil-end portions disposed at said inner circumference thereof to extend from the other end of said stator core and opposite outer coil-end portions disposed at said outer circumference to extend from the other end of said stator core, and
    said opposite coil-end portions extend in a direction between said axial direction and rotating direction of said rotor.

5. The alternator as claimed in claim 1, wherein cross-section of each of said conductor portions connected to said inner coil-end portions has a rectangular shape having longer radial sides than circumferential sides.

6. The alternator as claimed in claim 1, wherein
one of said conductor portions connected to said inner coil-end portion is disposed in each of said slots.

7. The alternator as claimed in claim 1, wherein
said conductor portions are disposed in front and rear layers in said slot respectively, and
one of said conductor portions connected to said inner coil-end portion is disposed in said front layer of one of said slots and another one of said conductor portions connected to one of said conductor portions connected to said outer coil-end portion is disposed in said rear layer of another of said slots.

8. An alternator for a vehicle comprising:
a magnetic field rotor having a pole core and a field coil,
a stator having a stator core with a plurality of slots, said stator including a multi-phase stator winding disposed in said slots, and
a cooling air generator for supplying cooling air in an axial direction of said core, wherein
said multi-phase stator winding has a plurality of pair conductor portions disposed respectively in front and rear layers,
each of said conductor portions is connected between a pair of coil-end portions extending from opposite ends of said stator core,
one of said coil-end portions is connected to one of said conductor portions disposed in one layer of one of said slots, said one of said conductor portions is connected to another of said coil end portions which is connected to another of said conductor portions disposed in a different layer of another of said slots so that coil-ends can be formed from two conductor portions,
whereby specific patterns are formed successively on the opposite ends of said stator core and those of said conductor portions connected to said coil-end groups disposed on the innermost circumference of said stator core are inclined in the same direction on each of the opposite ends, thereby forming cooling air passages along said conductor portions connected to said coil-end groups disposed on said innermost circumference; and
said rotor is disposed such that said cooling air supplied from said cooling air generator in said axial direction is directed into said cooling air passages.

9. The alternator as claimed in claim 8, wherein
one of said pair of coil-end portions of said innermost circumference of said coil-end groups extends in the rotating direction of said rotor from the end thereof toward the base thereof.

10. The alternator as claimed in claim 8, wherein
each of said conductor portions disposed in an inner circumference of said coil-end groups inclines in the circumferential direction to guide said cooling air axially and spirally.

11. The alternator as claimed in claim 10 wherein said cooling air generator includes a plurality of fan blades respectively disposed on opposite ends of said rotor.

12. The alternator as claimed in claim 11, wherein
said plurality of fan blades of one of said cooling fans are inclined at an acute angle to the axis of said rotor to drive cooling air in both axial and radial directions.

13. The alternator as claimed in claim 11 further comprising a pulley for rotating said rotor, and said pulley is disposed on the opposite side of said cooling air generator.

14. The alternator as claimed in claim 10 further comprising a pulley for rotating said magnetic field rotor, wherein
said pulley is disposed on the same side of said cooling air generator.

15. The alternator as claimed in claim 10, wherein
a plurality of pairs of said conductor portions are disposed in said rear and front layers in a line in the depth of each of said slots,
said conductor portions are connected with other conductor portions to form a plurality of joint portions, and
said conductor portions are disposed spaced, and apart from each other in said coil-end groups in the circumferential and radial directions.

16. The alternator as claimed in claim 10, wherein
a pair of said conductor portions is disposed in said rear and front layers,
said slots are disposed at 30° in electric angle and grouped into first and second slot groups next to each other,
a portion of said conductor portions in said first slot group composed of slots spaced apart one slot pitch with each other are connected in series to form a first series-connected group,
another portion of said conductor portions in said second slot group are connected in series to form a second series-connected group, and
a first phase winding is composed of said first and second series-connected groups connected in series to each other.

* * * * *

UNITED STATES PATENT AND TRADEMARK OFFICE
CERTIFICATE OF CORRECTION

PATENT NO. : 5,965,965
DATED : October 12, 1999
INVENTOR(S) : UMEDA et al.

It is certified that error appears in the above-identified patent and that said Letters Patent is hereby corrected as shown below:

On the title page item [30], insert

--May 26, 1997 [WO] WIPO...............PCT/JP97/01778--.

Signed and Sealed this

Eighteenth Day of July, 2000

Attest:

Attesting Officer

Q. TODD DICKINSON
Director of Patents and Trademarks